Figures 1, 2:
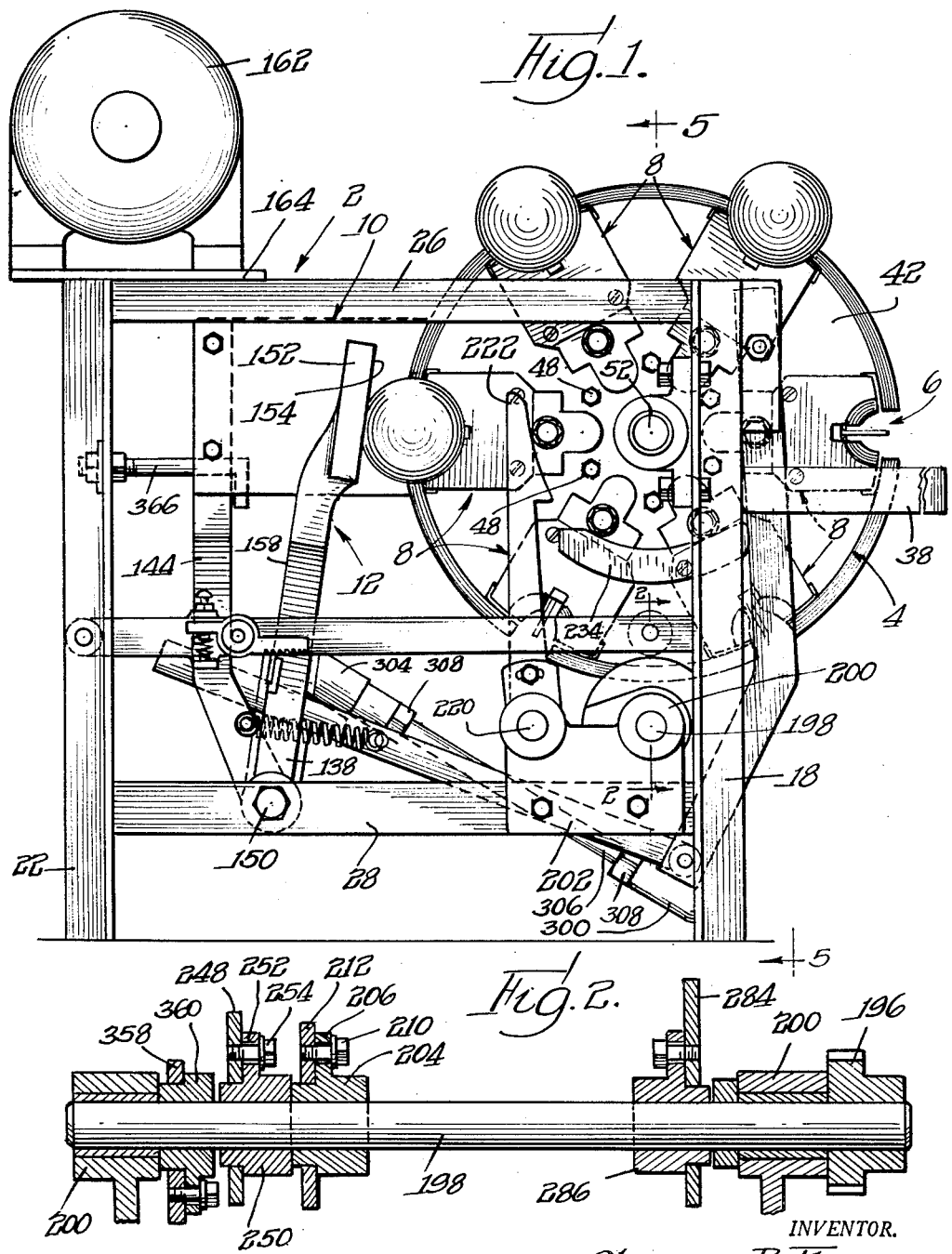

March 22, 1955     C. R. THOMPSON     2,704,561
FREESTONE FRUIT PITTER

Filed Sept. 1, 1950     10 Sheets-Sheet 1

INVENTOR.
Clarence R. Thompson
BY
Moore, Olson & Trexler
attys.

March 22, 1955  C. R. THOMPSON  2,704,561
FREESTONE FRUIT PITTER
Filed Sept. 1, 1950  10 Sheets-Sheet 2

INVENTOR.
Clarence R. Thompson
BY
Moore, Olson & Trexler
attys.

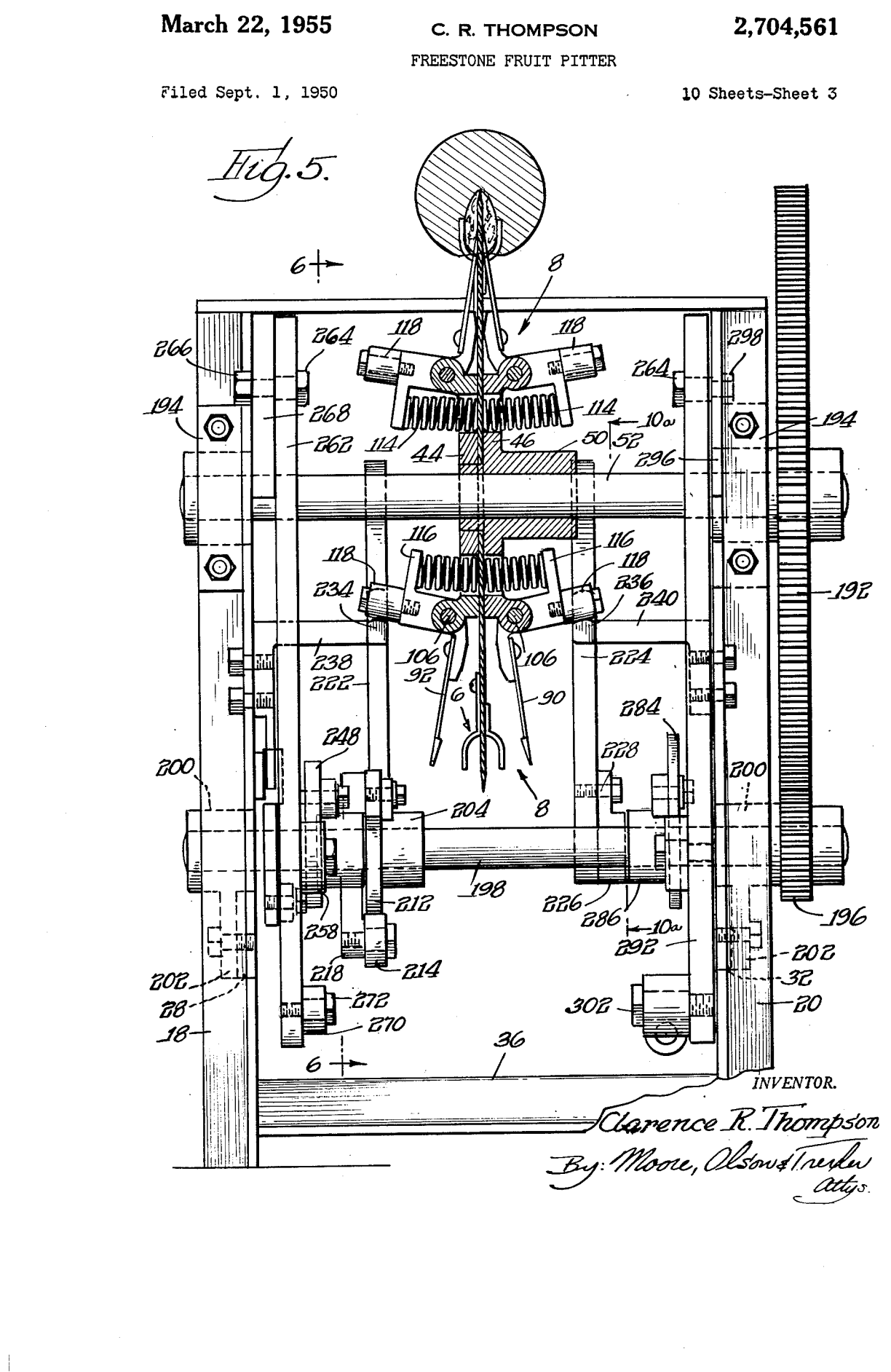

March 22, 1955     C. R. THOMPSON     2,704,561
FREESTONE FRUIT PITTER
Filed Sept. 1, 1950     10 Sheets-Sheet 3

Fig. 5.

INVENTOR.
Clarence R. Thompson
By: Moore, Olson & Trexler
Attys.

March 22, 1955

C. R. THOMPSON 2,704,561

FREESTONE FRUIT PITTER

Filed Sept. 1, 1950

10 Sheets-Sheet 4

INVENTOR.
Clarence R. Thompson
BY Moore, Olson & Trexler
attys.

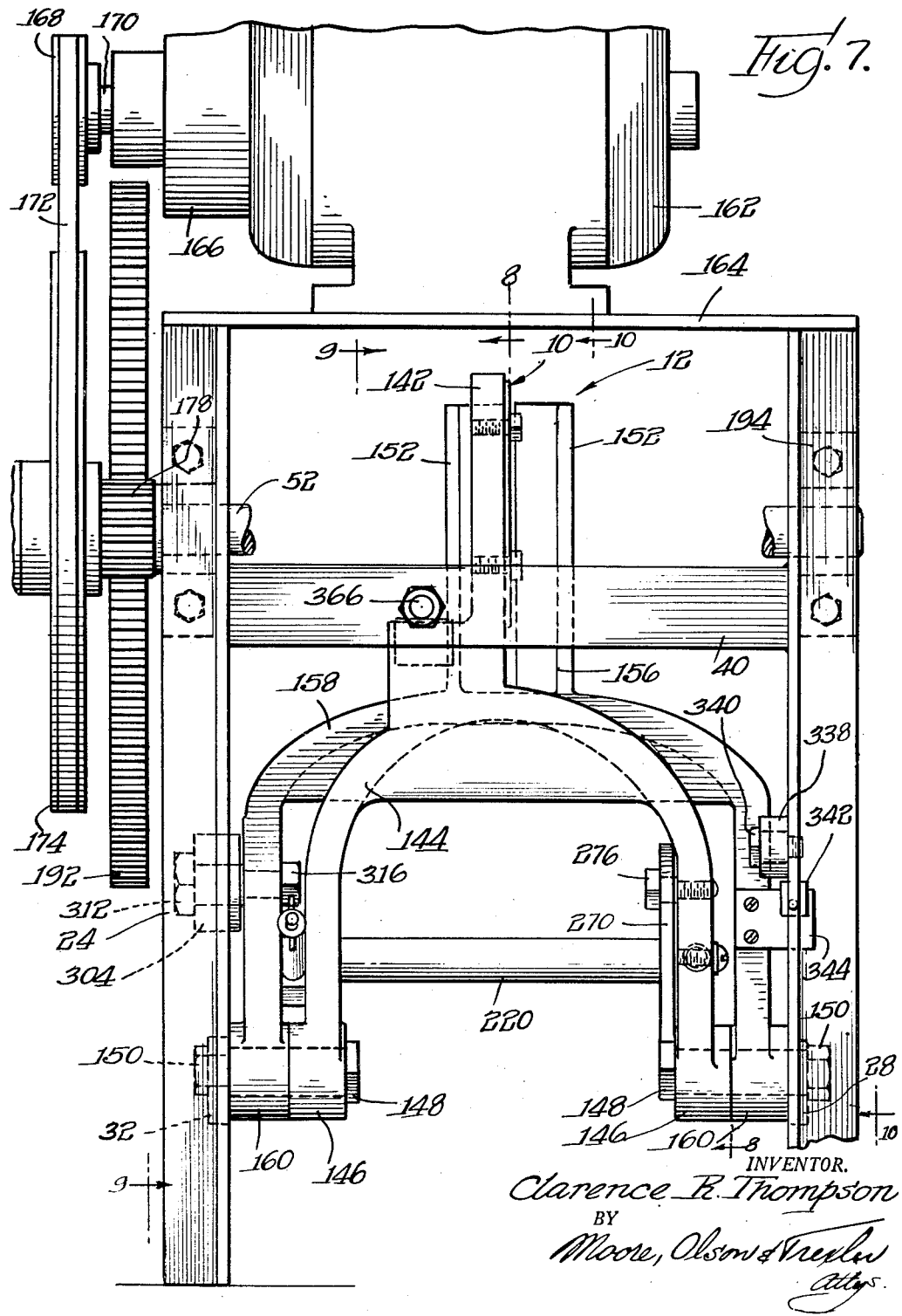

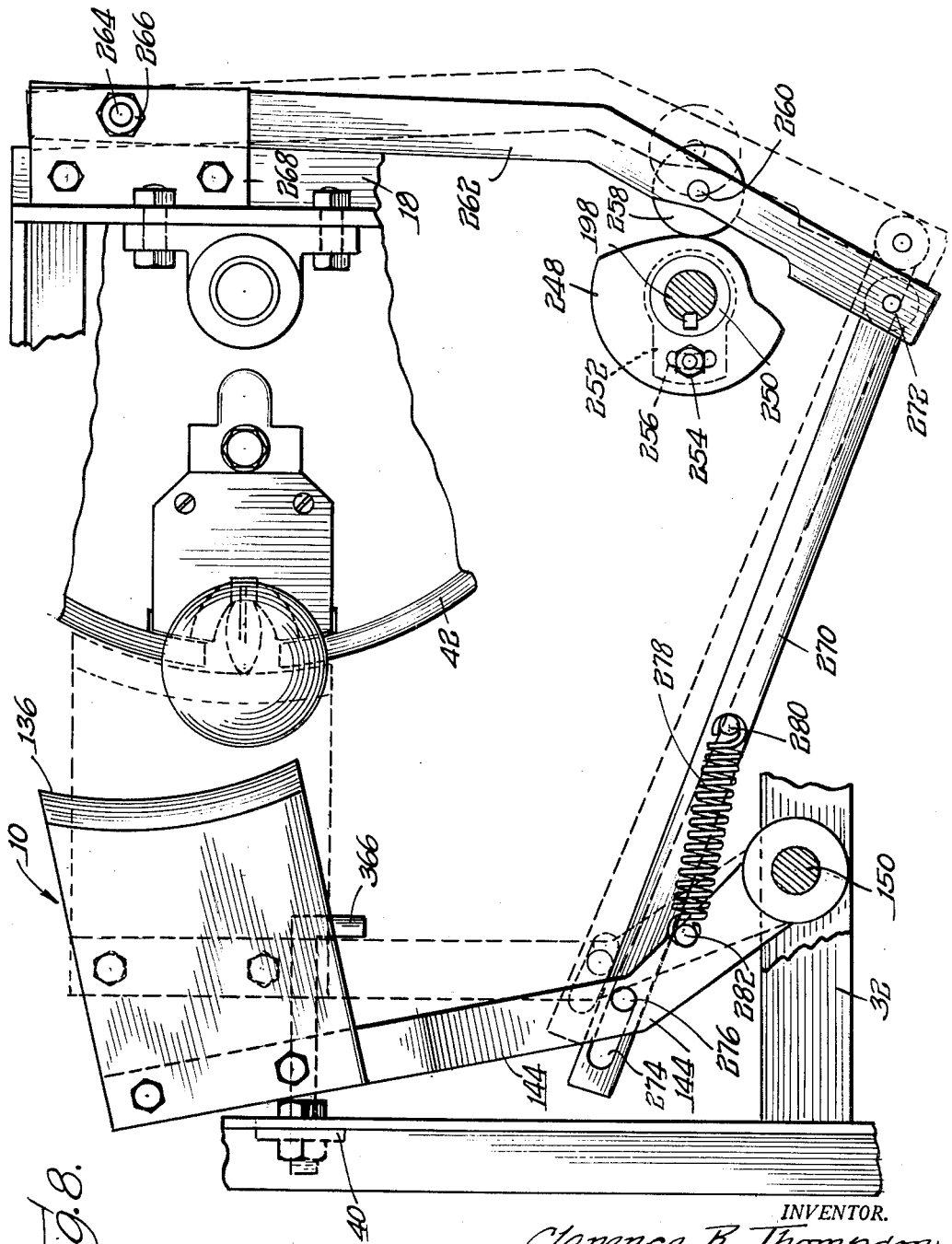

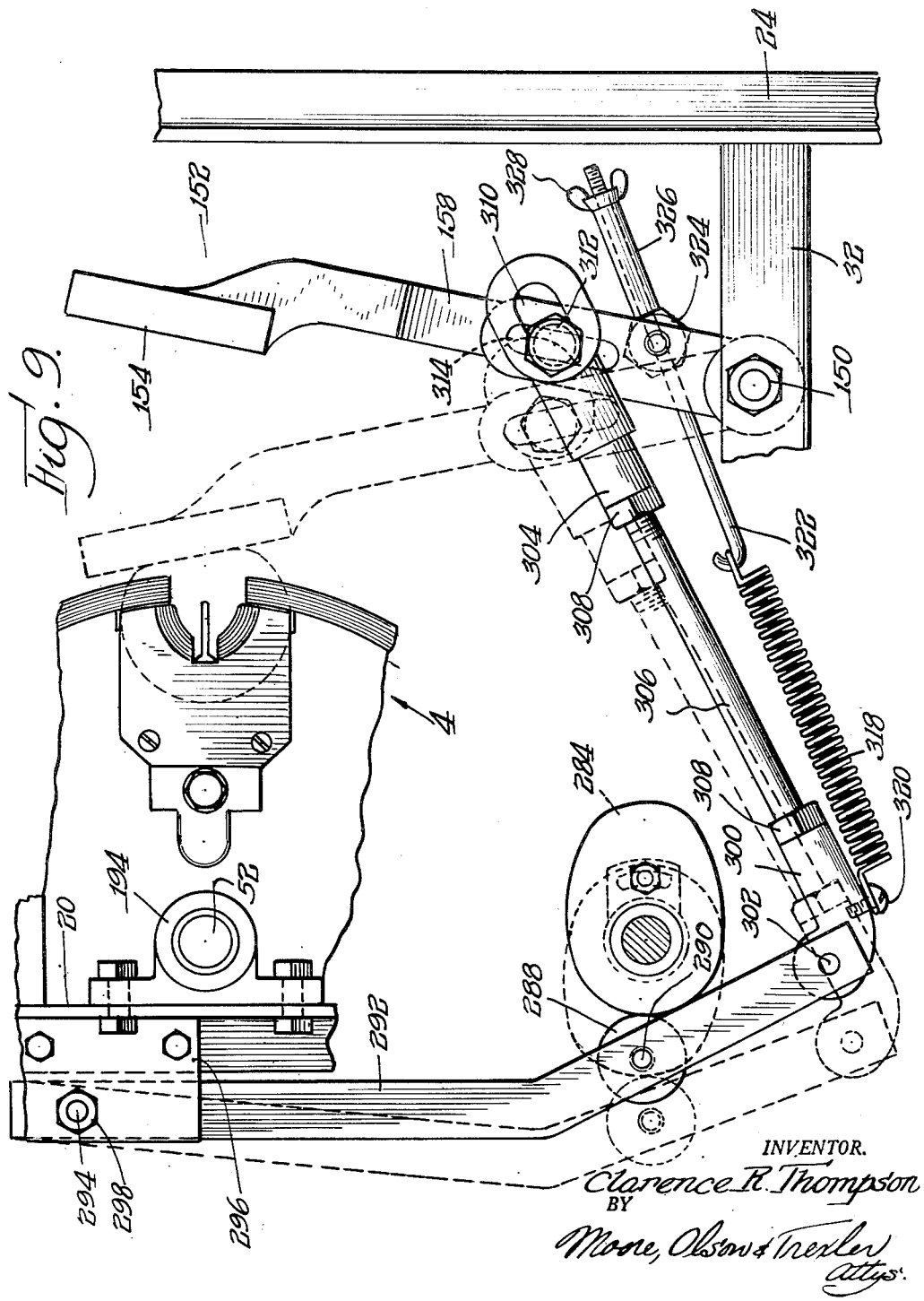

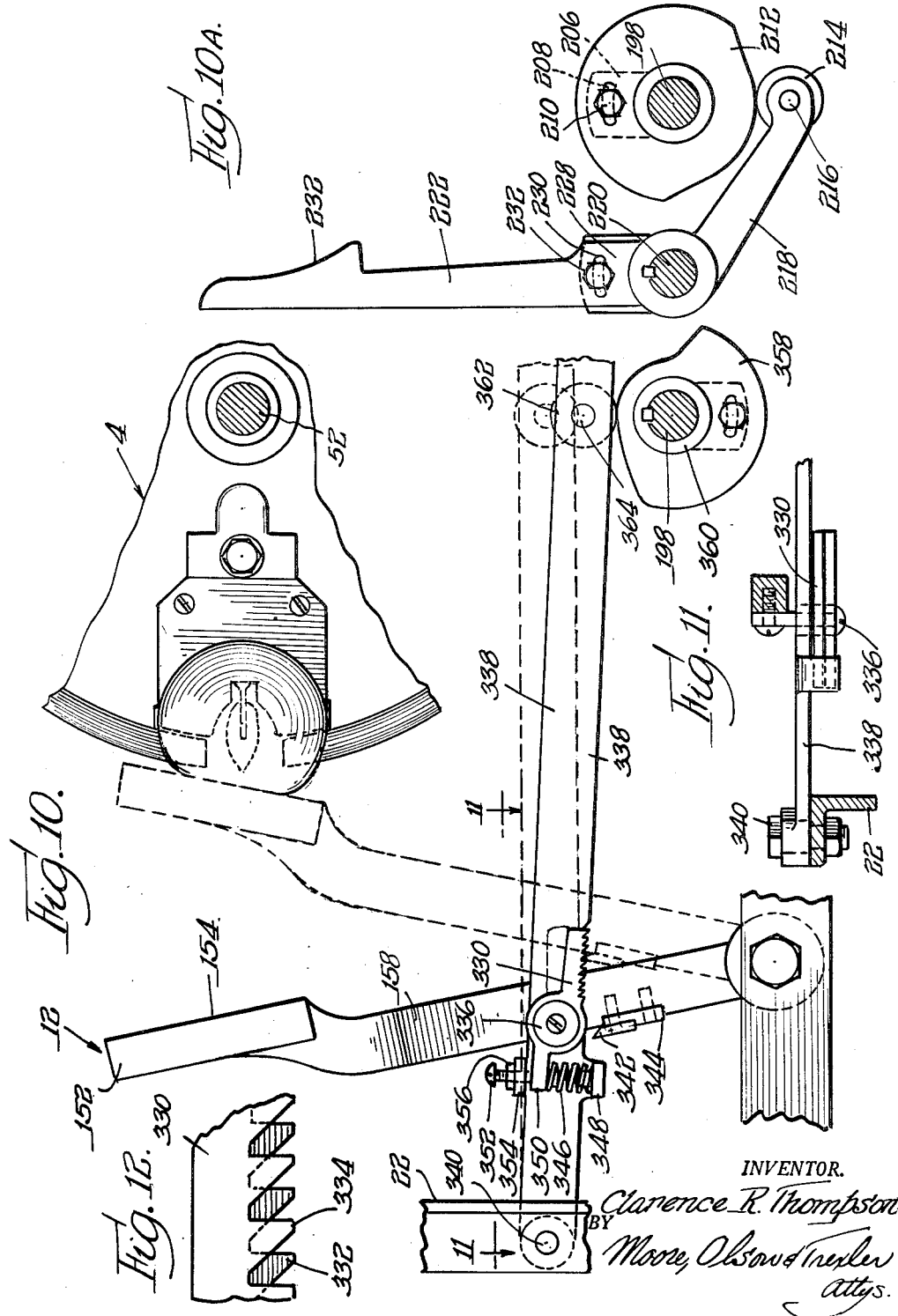

March 22, 1955  C. R. THOMPSON  2,704,561
FREESTONE FRUIT PITTER
Filed Sept. 1, 1950  10 Sheets-Sheet 9
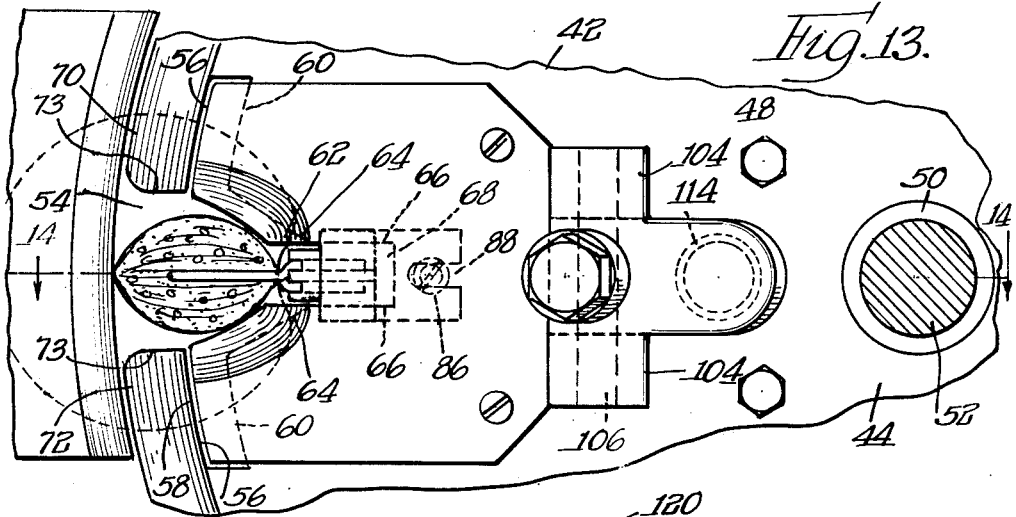
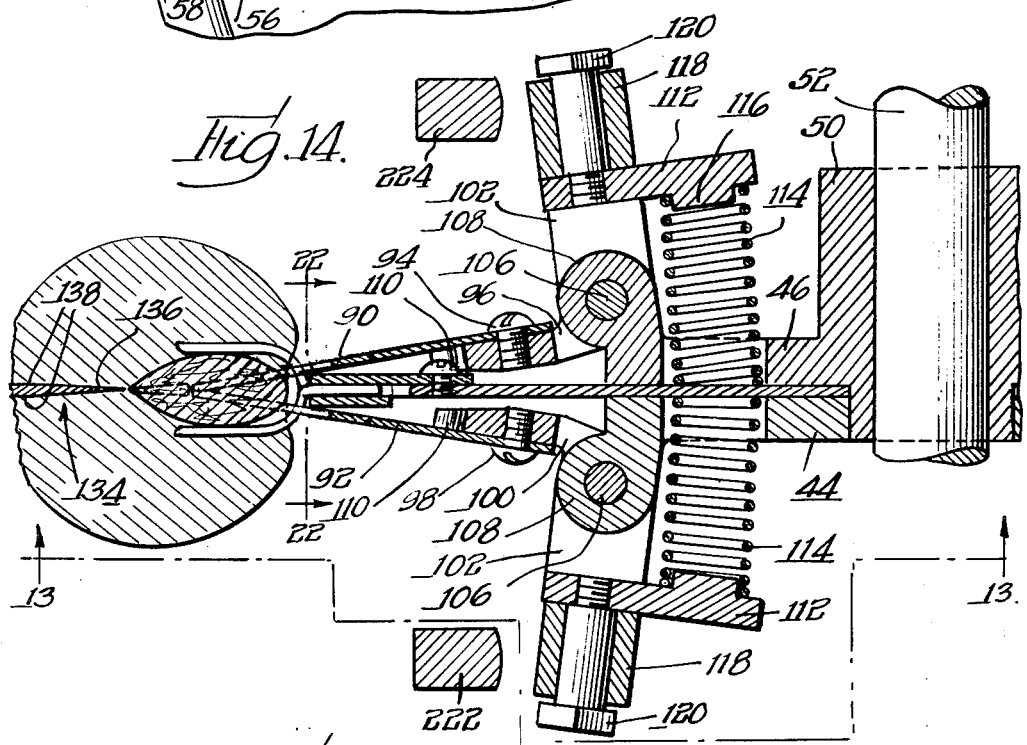
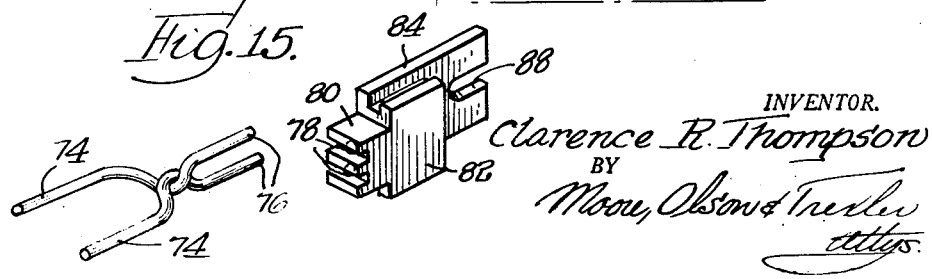
INVENTOR.
Clarence R. Thompson
BY
Moore, Olson & Trexler
Attys.

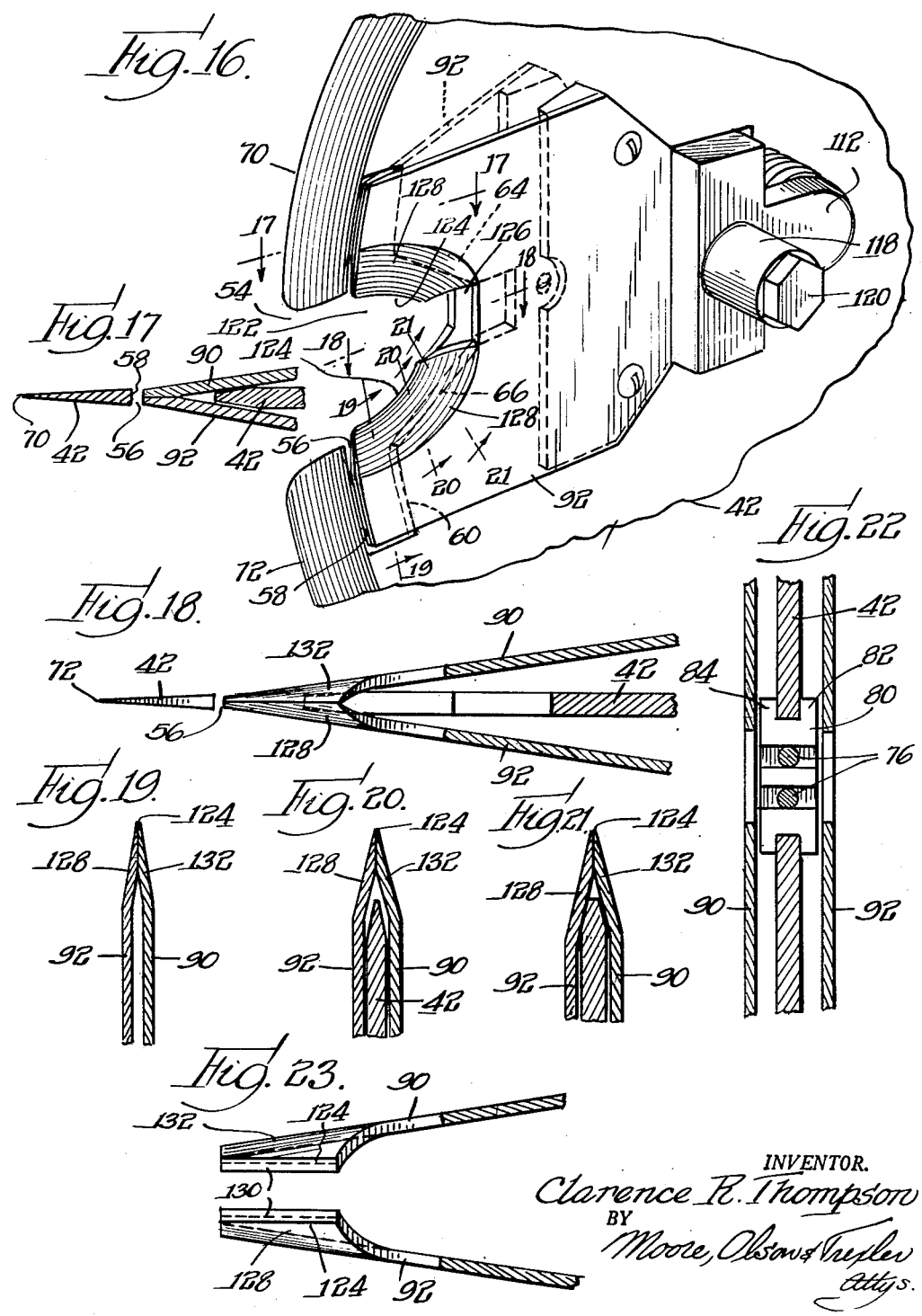

United States Patent Office 2,704,561
Patented Mar. 22, 1955

2,704,561

FREESTONE FRUIT PITTER

Clarence R. Thompson, Olympia, Wash., assignor to Special Equipment Company, Portland, Oreg., a corporation of Oregon Application September 1, 1950, Serial No. 182,773

11 Claims. (Cl. 146—28)

This invention relates to a machine for pitting freestone peaches and other fruit having the characteristics of freestone peaches, such, for example, as apricots and Italian prunes.

According to the present invention the fruit is impaled on a carrier or turret provided with fruit dividing means which as the fruit is placed on the carrier scores or severs the individual fruit inward from one end thereof and partially about the pit, the carrier conveying the impaled fruit to other fruit dividing means which scores or severs the flesh of the fruit inwardly from the opposite end of the fruit and about the remaining portion of one of said dividing means then operating to separate or spread the divided fruit halves and discharge, or permit the gravity discharge, of the fruit halves, from the pit which is retained in the carrier for subsequent discharge therefrom.

Among the objects of the present invention are to provide a pitting machine for freestone peaches or the like which comprises a continuously operating carrier moving at a substantially constant uniform rate and devices associated therewith for scoring or severing the flesh of the fruit inwardly from one end thereof and about, or partially about, the pit, to provide in association with such carrier and devices means operating automatically, and without interfering with the continuous movement of the carrier, to score or sever the flesh of the fruit inwardly from the opposite end thereof and about the remaining portion of the pit; to provide devices associated with the carrier of such construction that they may subsequently be automatically actuated to separate the severed or scored flesh of the fruit from the pit and discharge the pitted halves from the carrier as the carrier continues to move at the same uniform rate; and to provide a high speed automatic machine for pitting or stoning fruit, having freestone characteristics, without tearing, bruising or marring the flesh of the fruit.

Other objects of the invention are to provide, in a machine of the above stated character, means for retaining the stone of the fruit in the carrier and against movement with either half of the fruit as the scored or severed halves are divided or spread; to provide in such a machine impaling or severing devices of such construction that the individual whole fruits may be readily placed or impaled on the carrier while the carrier is moving or rotating; to provide a continuously rotating disc or turret having a plurality of devices or units associated therewith for receiving whole fruit and impaling the fruit on the disc or turret; to provide means associated with each such device or unit to penetrate the flesh of the fruit from the blossom end, encompass the pit and so control the position of the fruit on the disc that the stem end of the fruit projects from the disc and is scored substantially to the pit by a scoring or flesh severing device past which the fruit is carried by the continuously rotating disc or turret; to provide devices associated with the disc or turret and the scoring means to hold the fruit on the continuously rotating disc or turret while it is carried past the scoring means; to provide means associated with the disc or turret for thereafter spreading the flesh-severed halves of the fruit from the retained pit; to provide a continuously moving whole fruit carrier with a plurality of devices for holding whole fruits on the carrier while severing each whole fruit partially from one end thereof to, or substantially to, the pit, and to provide in combination with said carrier and partial-fruit-flesh severing means, devices for completing the severance of the flesh from the fruit as the fruit is being conveyed by said carrier and partial-fruit-flesh severing means; to provide a machine for first severing a whole fruit of the freestone type in a manner such that the flesh of the fruit is cut substantially diametrically, preferably through the suture plane, and closely around the peripheral outline of the pit, and then, while the pit is held, spreading the halves of the fruit by means which engages the cut faces of the fruit flesh substantially around the held pit and then exerts pressure outwardly upon the fruit halves to separate them from the held pit and to discharge them separately from the pit; to provide a novel type of flesh-severing and stoning mechanism for a whole fruit of the freestone type wherein a pair of blades having pit receiving recesses are relatively shiftable from an abutting position severing or partially severing the flesh of the fruit to about the pit to a position away from each other whereby, to separate the fruit halves from the pit held in a pit retainer projecting into the recesses of the blades; to provide fruit spreading means with curved flesh-severing or cutting edges or surfaces to penetrate the whole fruit from the blossom end thereof and sever the flesh thereof around the whole pit, whereby to spread the fruit halves upon completion of severance of the flesh thereof.

Figure 3:
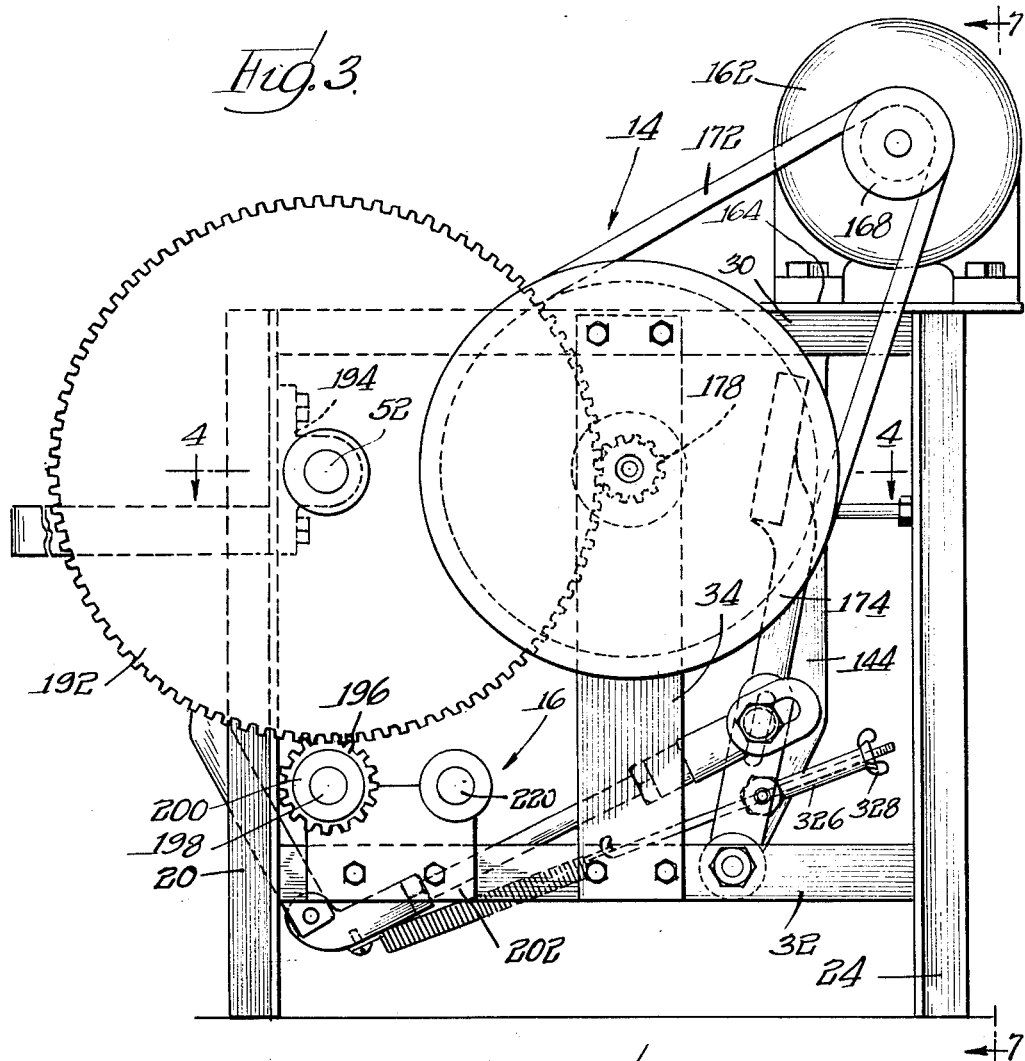
Figure 4:
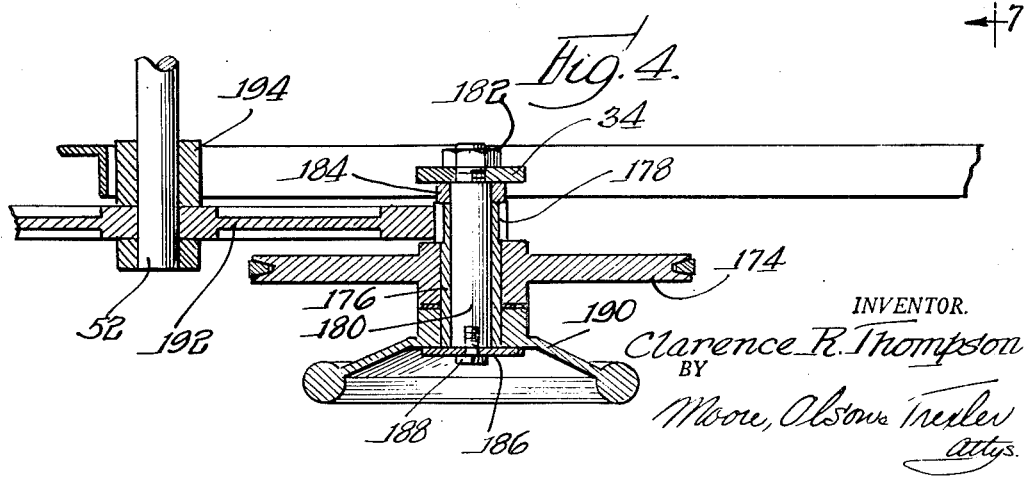
Figure 6:
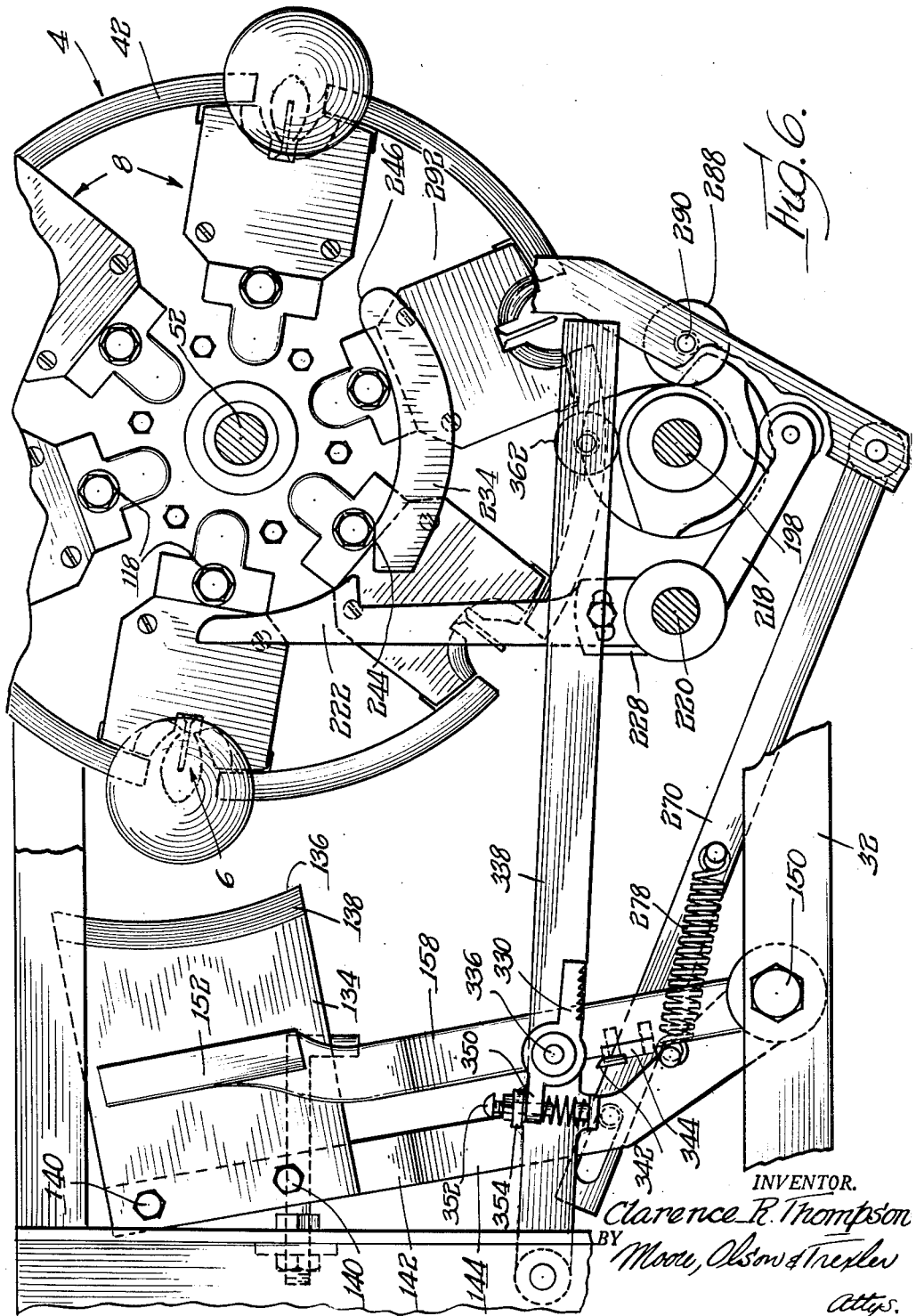

Other and further objects and advantages of the invention will be apparent from the accompanying drawings wherein:

Figure 1 is a view in elevation of the left hand side of a machine embodying the present invention;
Figure 2 is an enlarged fragmentary view in vertical section taken along line 2—2 of Figure 1;
Figure 3 is a view in elevation of the right hand side of the machine;
Figure 4 is a fragmentary view in horizontal section taken along the line 4—4 of Figure 3;
Figure 5 is a view in elevation of the front of the machine with certain parts being shown in vertical section;
Figure 6 is a fragmentary view in vertical section taken generally along the line 6—6 of Figure 5;
Figure 7 is a fragmentary view in vertical elevation of the rear of the machine;
Figure 8 is a fragmentary view in vertical section taken substantially along the line 8—8 of Figure 7;
Figure 9 is a fragmentary view in vertical section taken substantially along the line 9—9 of Figure 7;
Figure 10 is a fragmentary view in vertical section taken substantially along the line 10—10 of Figure 7;
Figure 10a is a fragmentary view in vertical section taken substantially along line 10a—10a of Figure 5;
Figure 11 is a fragmentary view in horizontal section taken along the line 11—11 of Figure 10;
Figure 12 is a fragmentary view in elevation of a ratchet shown in Figure 11;
Figure 13 is an enlarged, fragmentary view in elevation and partially in section taken substantially along the line 13—13 of Figure 14;
Figure 14 is a fragmentary view in horizontal section taken along the line 14—14 of Figure 13;
Figure 15 is a view in perspective of a pit retaining prong and its mounting member;
Figure 16 is a view in perspective showing the construction of a fruit spreader unit and its interfitting with the whole fruit carrier;
Figures 17 to 21 are fragmentary views in section taken along lines 17—17, 18—18, 19—19, 20—20, and 21—21, respectively of Figure 16;
Figure 22 is a view in vertical section taken along the line 22—22 of Figure 14; and
Figure 23 is a view showing the manner of forming certain fruit penetrating surfaces of the spreader blades.

Referring now more particularly to the drawings, a preferred embodiment of a machine embodying the invention comprises a frame 2; a fruit carrier or conveyor 4; a plurality of pit retaining means or devices 6 associated with the carrier 4; a plurality of combined fruit-flesh severing and spreading means or units 8 associated with or carried by the carrier 4; additional fruit-flesh severing or scoring means 10; fruit retaining, pressing or holding means 12; driving and actuating mechanisms and means 14 and 16 (Fig. 3) for driving the carrier or conveyor 4 and actuating the fruit-flesh severing and spreading units 8, the additional fruit-flesh severing or scoring means 10, and the fruit retaining, pressing or holding means 12.

Machine frame

The machine frame 2 comprises, as best seen in Figures 1, 2, 5 and 7, four angle iron frame members including a left, front, upright member 18, a right, front, upright member 20, a left, rear, upright member 22 and a right, rear, upright member 24. A crossbar 26 connects the upright members 18 and 22 at the top thereof, and a similar crossbar 28 connects the same members at a lower portion of the frame. Similar crossbars 30 and 32 connect the upright members 20 and 24 at the top thereof and at the lower portion thereof as shown in Figure 3. A vertical frame bar 34 (Fig. 3) is bolted at its upper and lower ends to the right side crossbars 30 and 32. An angle iron 36 (Fig. 5) interconnects the lower ends of the front upright members 18 and 20, and a U-shaped bar 38 (Figs. 1 and 3), bolted at its opposite ends to the members 18 and 20, projects forwardly therefrom and forms a guard around the carrier or conveyor 4. A crossbar 40 (Fig. 7) interconnects the rear upright members 22 and 24.

Fruit carrier or conveyor

The fruit carrier or conveyor 4, as best shown in Figures 1, 3, 5, 6, 8, 13 and 14, comprises a continuously rotating disc 42 mounted between discs or flanges 44 and 46 (Figs. 5 and 14) fastened together in any suitable manner as by bolts 48 (Fig. 1), the disc 46 having a hub 50 keyed or otherwise secured to a shaft 52 for rotation therewith.

The rotating disc 42 is provided with a plurality, for example, six, pit passages or pit receiving recesses or passages 54, as best seen in Figure 13, opening inwardly from the periphery of the disc, each passage 54 communicating with oppositely extending, lateral passages or recesses 56, which are defined by arcuate edges 58 and 60 formed concentric to the axis of the disc. The passages 54 and 56 also communicate with a passage or recess 62 defined by oppositely inclined edges 64 extending from the defining edges of the passages 54 and 56 to the opposite defining edges 66 of a generally rectangular inner passage or recess 68 communicating with the passage or recess 62. The periphery of the disc 42 is provided with opposite, annular, beveled, peripheral surfaces sharpened to flesh-severing edges 70 and 72 adjacent and on opposite sides of the pit receiving passage 54. The opposed edges 73 defining the pit receiving passage or recess 54 are also sharpened for ease of penetration into the flesh of the fruit severed by the cutting or flesh-severing edges 70 and 72 of the disc periphery.

Pit retaining means

The pit retaining means 6 comprises a plurality of retainers equal in number to the number of pit passages 54 in the disc 42, each retainer comprising a U-shaped member or fork 74, best seen in Figures 15 and 22, having mounting prongs 76 received in apertures 78 in mounting block 80, the block being snugly received by the defining edges 66 of the inner passage or recess 68 and having spaced furcations 82 and 84 receiving and engaging the opposite surfaces of the disc about the recess 68. The block 80 is adjustably mounted on the disc as by bolt 86 (Fig. 13) passing through a slot 88 in the furcation 84 and threaded into the disc. The tines of the pit receiving and retaining fork 74 lie in a plane substantially perpendicular to the carrier disc 42 so as to restrain movement of the pit laterally of the disc and so that the fork penetrates the fruit from the blossom end and encompasses the pit in the plane of its smallest dimension when the fruit is impaled on the disc along the suture plane of the fruit.

Combined fruit severing and spreader means

The fruit-flesh severing and spreader means or units 8, as best seen in Figures 1, 3, 5, 6, 13, 14 and 17, are equal in number to the number of pit receiving passages 54 in disc 42. Each such means or unit comprises a pair of spreader blades 90 and 92 (Figs. 5, 13, 14 and 16 to 21) mounted on opposite sides of the fruit carrier or disc 42, the blade 90 being secured as by a screw 94 to bracket 96 and the blade 94 being similarly fastened as by screw 98 to bracket 100. The similar brackets 96 and 100 each have a U-shaped mounting arm 102 provided with bosses 104 (Fig. 13) journalled on a common stud 106 mounted in a boss 108 formed on the periphery of the disc 46, or the disc 44. The spreader blade mounting arms 110 of the pivoted, mounting brackets 96 and 100 underlie the spreader blades and are so shaped that the spreader blades 90 and 92 when in closed position converge upon the disc and meet within the arcuate passages or recesses 56 as shown in Figures 14 and 16 to 21.

The pivoted mounting brackets 96 and 100 are each provided with a lug or flange 112 projecting inwardly of the disc from the base of the U-shaped arm 102 and a coiled spring 114 received at one end in an opening in the disc 46, or 44, bears against the surface of the disc, and at its other end bears against the lug 112, which lug is formed with a circular protuberance 116 fitting within the outer end of the coiled spring 114. Each pivoted bracket is also provided with an actuating cam follower, roller 118 mounted on the base of the U-shaped arm 120 of the bracket, as by a stud 102 threaded into the bracket. It will thus be seen that the coiled springs 114 urge the pivoted brackets 96 and 100 toward each other and to the normal position shown in Figure 14, and consequently, normally maintain the spreader blades 90 and 92 in closed position as shown in said figure.

The spreader blades 90 and 92 are formed, as best illustrated in Figures 16 to 21 and 23. Each blade is formed with a pit receiving recess 122 defined by opposite arcuate edges 124 extending inwardly from the outer edge of the blade to a generally rectangular recess 126 for receiving the mounting block 80 of a pit retainer 6. The blade 92 is provided with arcuately extending, laterally offset portions 128 formed, as shown in Fig. 23, by bending or twisting these portions out of the plane of the main body portion of the blade and then guiding the free, offset edge along the dotted line 130. The blade 90 is similarly formed, with arcuately extending portions 132, laterally offset oppositely to the like portions 128 of the blade 92. Thus, when the blades are assembled on the brackets 96 and 100 the arcuate edges 124 abut within the passage 62 of the disc, as seen in Figs. 16 to 21, to form sharp fruit flesh severing edges and the offset portions 128 and 132 form fruit spreading surfaces diverging, in every direction, from the flesh severing edges 124 to spread the flesh of the fruit severed by said edges.

Fruit-flesh severing or scoring means

The fruit-flesh severing or scoring device 10 provides means additional to the sharpened peripheral edges 70 and 72 and the sharp edges 124 of the spreader blades for completing the severance of the flesh of the fruit by severing the flesh of that portion of the fruit which projects beyond the periphery of the disc 42. This device or means 10 comprises, as best seen in Figures 1, 6, 7, 8, 13 and 14, a flesh-severing or scoring blade 134 having an arcuate forward edge 136 substantially concentric to the disc 42 when the scoring blade is in the forward position shown in Figures 1, 8 and 13. The edge 136 is sharpened as by beveling of the opposite surfaces of the blade adjacent the edge 136 as seen in Figure 13, the beveled surfaces 138 forming the sharpened edge 136 extending a substantial distance inwardly from the edge 136 so that the blade readily penetrates the flesh of the fruit without bruising it as the sharpened edge severs the flesh and the blade approaches the periphery of the disc while the peach is being swung by the continuously moving carrier or conveyor through the angle subtended by the forward edge of the scoring blade. The blade 134 is secured at its rear end as by bolts 140 to a vertical arm 142 formed on a bifurcated lever or yoke 144 (Fig. 7). The yoke is formed at its lower end with hubs 146 journalled on headed stud bolts 148 received in apertures in the opposite crossbars 28 and 32 of the machine frame and secured thereto as by nuts 150. The carrier or mounting arm 144 on the scoring blade is bifurcated, or formed as a yoke, to permit the fruit halves to be discharged from the machine through the arms of the yoke onto a suitable belt or other conveyor passing between the yoke-arms in a direction from front-to-rear of the machine.

Fruit retaining, pressing or holding means

The fruit retaining, pressing or holding means 12, as best seen in Figures 1, 3, 6, 7, 9 and 10, comprises a pair of pressure pads 152 which extend on opposite sides of the scoring blade 134 in close juxtaposition thereto, and have plane surfaces 154 adapted to engage the butt end of the fruit on opposite sides of the suture plane when the pads are moved to the forward position shown in Figures 1 and 9 whereby to press or push the fruit halves inwardly of the conveyor disc across the sharpened edge thereof and along spreader blades, and across the sharp edges thereof, to complete severance of the fruit flesh and hold the fruit while the spreader blades are moved to open position.

The pressure pads 152 are preferably formed integrally with, and (Fig. 7) upstand from, a bifurcated carrier arm or yoke 158 having at its lower end hubs 160 journalled on the stud bolts 148.

*Driving and actuating mechanisms and means*

The driving means 14 for the carrier or conveyor comprises, as best seen in Figures 1, 3, 4, 5 and 7, an electric motor 162 bolted to a mounting plate 164 welded or otherwise secured to the rear upright members 22 and 24 and the side crossbars 26 and 30; the motor being provided with a suitable set of speed reducing gears in a housing 166 (Fig. 7) fastened to the motor housing. A pulley 168 is secured to the outer end of the output shaft 170 and drives a V-belt 172 which in turn drives a large pulley 174 keyed or otherwise fastened to hub 176 (Fig. 4) of a small pinion 178 journalled on a stud shaft 180 (Fig. 4) mounted in a suitable aperture in the upright frame bar 34 and fastened thereto as by a nut 182 threaded on the inner reduced end of the stud shaft.

The pinion 178, with its long hub 176, is journalled on the stud shaft between a collar 184 and a washer 186 fastened to the other end of the stud shaft as by a screw 188. The washer 186 also serves to retain on the stud shaft and the hub of the pinion 178 a handwheel 190 which may be keyed to the hub 176 or connected thereto by a normally released clutch (not shown) permitting the handwheel to be used for manual rotation of the pinion 178 whenever desired. The small pinion 178 meshes with a large pinion or gear 192 fastened to one end of the drive shaft 52 for the carrier or conveyor 4, the drive shaft 52 being journalled in bearing blocks 194 (Figs. 4 and 5) bolted to the front upright frame members 18 and 20. The gear 192 in turn meshes with a pinion 196 (Fig. 3) on cam shaft 198 journalled in bosses 200 formed in plates 202 bolted to the crossbars 28 and 32 (Figs. 3 and 4). A hub 204 (Figs. 2, 5 and 10a) is keyed to the cam shaft 198 and is formed with a radial arm 206 having an arcuate slot 208 which receives a bolt 210 threaded into cam 212 mounted on a reduced portion of the hub 204 so that cam 212 is adjustably connected with the shaft 198 for angular, timing adjustment relative to the shaft. The cam 212 is engaged by a cam roller 214 (Figs. 5 and 10a) journalled on a stud bolt 216 threaded into the outer end of a lever 218, keyed at its upper end to a rock shaft 220. Spreader blade actuating levers 222 and 224 (Figs. 1, 5, 6 and 10a) are journalled on the rock shaft 220 in appropriately spaced relation to engage the rollers 118 of the spreader blade units 8 and are adjustably secured to hubs 226 (one only being shown in the drawings) keyed to the rock shaft 220, and each provided with radial arms 228 having an arcuate slot 230 (Figs. 6 and 10a) receiving a bolt 232 threaded into the spreader blade actuating lever, the adjustable connections between the spreader blade actuating lever and the rock shaft 220 permitting ready adjustment of the actuating lever angularly relative to the rock shaft so that the levers may be properly adjusted simultaneously to engage the rollers 118 of the spreader blades of each spreader blade unit and thereby simultaneously swing these spreader blades to an open position as illustrated in Figure 5.

Each of the actuating levers 222 and 228 is formed at the upper free end with a circular, roller engaging surface which is substantially concentric to the axis of the threaded shaft 52 so that when the levers 222 and 224 have engaged the rollers 118 and opened the spreader blades, the rollers are properly directed along a path concentric to the axis of the conveyor and the spreader blades thus maintained in fully opened position while the rollers ride along the surface 232 of each actuating lever as the turret continues to revolve without interruption of its movement.

The spreader blades are maintained in open position for a substantial angular movement of the turret, preferably through an angle of approximately 120 degrees of timed movement, by the roller engaging surfaces 232 of the spreader blade actuating levers 222 and 224 and by stationary arcuate guides 234 and 236 (Figs. 1, 5 and 6) formed on the outer ends of brackets 238 and 240 (Fig. 5) bolted to uprights 18 and 20. Each of these arcuate guides 234 and 236 is formed with an upper guide surface 242, concentric to the axis of the turret shaft 52, and with a chordal cam surface 244 adapted to engage the pair of rollers 118 of each spreader blade unit and move them radially inward of the turret onto the guide surface 242. The opposite end of each guide bar 234 is formed with a rounded cam surface 246 permitting relatively gradual radial outward movement of each roller 118 under the action of its coil spring 114 thereby to return the spreader blades of each unit to closed position to receive another whole fruit.

The actuator mechanism 16 also includes an actuating cam 248 (Figs. 2, 5 and 8) adjustably secured to a hub 250 keyed to the cam shaft 198 and provided with a radial arm 252 having an arcuate slot 256 receiving a bolt 254 threaded into the cam 248, which is mounted on a reduced portion of the hub 250 for angular adjustment to time the operation of the scoring means or device. The cam 248 actuates a cam follower roller 258 journalled on a stud bolt 260 threaded into an actuating lever 262 journalled on a stud bolt 264 fastened, as by a nut 266, to a mounting plate 268 bolted to the front upright frame member 18.

The actuating lever 262 has a lost motion connection to the scoring blade carrier or yoke 144. A link 270 is pivoted at its forward end as by stud bolt 272 to the lower end of the actuating lever 262. The link 270 is formed adjacent its opposite end with a longitudinal slot 274 which receives a pivot stud bolt 276 threaded into one of the arms of the yoke 144. A coil spring 278 is secured at one end, as by a pin or rivet 280, to the link 270 and at the other end by a similar pin, pivot or bolt 282 to an arm of yoke 144 and normally urges the link and yoke into the position illustrated in Figure 6 and in full lines in Figure 8. Thus, the spring 278 governs the lost motion connection between the actuating lever 262 and the carrier or yoke 144.

The fruit pressing, retaining or holding means 12 is actuated by cam 284 (Figs. 2, 5 and 9) of the actuating mechanism 16, this cam being mounted on the reduced portion of hub 286 and adjustably secured thereto as shown in Figure 2 in a manner similar to the adjustable mounting of the cams 204 and 250. The cam 284 actuates a cam follower, roller 288 (Figs. 6 and 9) journalled on a stud bolt threaded into an actuating lever 292 journalled at its upper free end on a stud bolt 294 fastened to a bracket plate 296 as by a nut 298, the bracket plate being bolted to the upright frame member 20 as shown in Figure 5. A link 300 (Fig. 9) is journalled on a pivot stud 302 threaded into the lower end of the actuating lever 292, the link 300 being adjustably connected to a link 304 by a link rod 306 threaded into the links 300 and 304 and held in adjusted position by clamping nuts 308. The link 300 is formed with a longitudinal slot 310 which receives a pivot, stud bolt 312 which passes through a longitudinal slot 314 in an arm of the yoke 158, the stud bolt being provided with a nut 316 (Fig. 7) for holding it in mounting position. A coil spring 318 is secured at one end as by a screw 320 to the link 300 and at the other end to the book end of an adjusting rod 322 slidably mounted in a diametrical slot of a bearing 324 pivoted to the same arm of the yoke 158 as the stud 312. The adjusting rod passes from the bearing 324 through a sleeve 326 and has threaded on its upper end an adjustable wing nut 328, by means of which the tension of the spring 318 may be regulated.

The spring 318 thus governs the lost motion connection between the actuating lever 292 and the pivot stud 312 carried by the pressure pad carrier and serves normally to urge the link 304 and pivot stud 312 into the position shown in solid lines in Figure 9, wherein the stud rests at the inner end of the slot 310. The spring also serves to maintain the follower roller 288 in engagement with the cam 284. The adjusting rod 322 permits ready regulation of the tension of the spring 318, and thus adjustably determines the pressure exerted by the pressure pad upon the fruit, which pressure may, of course, be varied with the different grade-sizes of fruit handled by the machine in different runs.

Means is provided for locking the pressure pad against reverse movement from the fruit pressing position shown in dotted lines in Figures 9 and 10, it having been found that less ripe fruit tends to push the pressure pads back if the spring 318 is not under relatively great tension. However, spring 318 if provided with relatively great tension tends to bruise the more ripe fruit. The greener fruit in pressing the pressure pad reversely would at times drop away from the carrier 4 without being properly pitted. Accordingly, applicant has provided latching means for preventing reverse movement of the pressure pad, which latching means is automatically operated on forward movement of the pressure pad and is automatically released by the actuating mechanism 16 on completion of the pitting and spreading operation to release the pressure pad for reverse movement. This automatic latching means comprises a pair of ratchet bars 330 (Fig. 11) having staggered teeth 332 and 334 (Fig. 12), the ratchet bars being pivoted on a common stud bolt 336 carried by a bar 338 journalled at one end on a stud bolt 340 secured to the rear upright frame member 22, the ratchet bars 330 cooperating with a pawl 342 carried by a plate 344 (Figs. 6, 7 and 10) set in a recess in the rear edge of one arm of the pressure pad carrier or yoke 158 and bolted thereto. A coil spring 346 is mounted between a lug 348 projecting laterally from the bar 338 and rearwardly extending arms 350 of ratchet bars 330 and normally urges the ratchet bars into position for latching engagement with the pawl 342. A set screw 352 threaded in a lateral lug 354 of the bar 338 limits the clockwise movement of the ratchet bars and is held in adjusted position as by clamping nut 356. The ratchet carrying bar 338 is actuated to release the ratchet bars from the pawl by means of a cam 358 (Figs. 2 and 10), which is mounted on a reduced portion of a hub 360 keyed to the cam shaft 198, the cam being fastened to the hub in the same manner as the cams 212, 248 and 284 are secured to their mounting hubs, so that the timing of the release of the latch for the pressure pads may be precisely determined. The cam 358 actuates a cam roller 362 journalled on a stud bolt 364 at the forward end of the bar 338.

Operation of the machine

The motor being energized, drives the disc 42 of the carrier or conveyor 4 at a continuous uniform rate. Whole fruit, such as peaches, roughly graded as to size, is supplied in a suitable manner to an operator who, standing at the front of the machine, impales the fruit along its suture plane on the continuously rotating disc 42 by so moving the fruit radially of the disc that the sharpened edges 70 on opposite sides of a radial passage 54 penetrate the fruit and sever the flesh of the fruit as the operator pushes the fruit radially onto the turret disc and causes the pit to pass between the prongs 74 of the pit retaining member or fork. As the operator thus moves the whole fruit onto the turret, the sharpened edges 70 and 72 sever the flesh of the fruit along the suture plane and in close proximity to the pit edges of maximum diameter along lines which are substantially parallel to the long axis of the pit. The sharp arcuate edges 124 of the spreader blades serve to sever the flesh of the fruit between the parallel lines of severance formed by the sharpened edges of the disc down to, and about, the rear portion of the pit. The spreader blades, by reason of their divergence as shown in Figure 14, serve to spread the flesh of the fruit from the rear portion of the pit.

As the turret disc continues to revolve with the fruit impaled on the disc and on one of the spreader units and its associated pit retaining fork, the whole fruit is carried in a counterclockwise direction, as seen in Figure 1, to a position in the path of the scoring means 10 and the fruit retaining and pressing means 12. At this time the cam follower 258 on the scoring blade actuating lever 262 (Fig. 8) reaches a cam portion of increasing radius and the lever is therefore swung in a counterclockwise direction as seen in Figure 8, thus causing the link 270 to move to the right from the full line position as shown in Figure 8, to the dotted line position and the scoring blade to be swung in a clockwise direction from the full line position to the dotted line position. The scoring blade in moving to this dotted line position from the full line position penetrates the flesh of the moving fruit until the blade engages the end of the pit or engages a stop 366 (Figs. 7 and 8) bolted to and projecting forwardly from the crossbar 40 wherein the arcuate edge 136 of the scoring blade is in close proximity to the periphery of the disc 42 and substantially concentric to its axis. If the pit is substantially larger than normal, it may project beyond the periphery of the disc to such an extent that the scoring blade engages the end of the pit and the spring 278 yields, allowing the actuating lever 262 and link 270 to continue their movements while permitting the scoring blade to remain at rest, the pin 276 connecting the link 270 to the yoke 144 moving freely in the slot 274. It should be noted that the cam 248 is provided with a circular edge portion of maximum diameter which extends throughout an arc of approximately 180 degrees so that the scoring blade is retained in its forward fruit-flesh severing position throughout substantially one half of a revolution of cam shaft 198. In timed relation with the movement of the scoring blade and while the scoring blade is in its advanced, fruit-flesh severing position, the cam follower roller 288 is engaged by a cam surface of increasing diameter and is thereby moved in a clockwise direction as seen in Figure 8. The cam 284 thus causes the pressure pad actuating lever 292 to be swung in a counter-clockwise direction as seen in Figure 9 from the full line position to the dotted line position. This movement of the lever 292 in a counter-clockwise direction as seen in Figure 9 corresponds to a movement of that lever in a clockwise direction as seen in Figure 6. Such movement of the actuating lever 292 thus causes, through the links 300, 306, 304, the spring 318 and rod 322, a movement of the pressure pad in a counter-clockwise direction as seen in Figure 9, and in a clockwise direction as seen in Figure 6, thereby to advance the pressure pads into pressing engagement with the fruit impaled on the carrier disc and in fruit scoring engagement with the scoring blade 126. The pressure exerted by the pads upon the moving fruit is determined by the adjusted tension of the spring 318, for when that determining pressure is exceeded, the spring 318 yields, allowing the continued movement of the actuating lever 292 and the links 300, 306 and 304 without moving the pressure pads, the stud 312 moving freely in the slot 310. It should be noted that the slot 314 in one of the arms of the pressure pad yoke 158 permits adjustment of the pressure pads for different grade-sizes of fruit without varying the timing or pressure exerted, or to be exerted, by the pads upon the fruit.

If the fruit has not been fully impaled upon the carrier disc and the pit has not been fully seated within the pit retaining means 6, the scoring blade on engaging the pit or the pressure pads on engaging the fruit, moves the fruit radially inward of the turret until the pit of the fruit is fully seated within the pit retainer. Thus, the scoring blades and the pressure pads so act upon the fruit as to insure full seating of the pit within the pit retaining fork. As the fruit pressing pads move to the dotted line position in Figures 9 and 10 the fruit is pushed or pressed inwardly of the turret, across the sharp edges 124 of the spreader blades and along these blades. Thus the portions of the fruit flesh between the pit and the defining edges 73 of the pit passage 54 (see Fig. 13) are severed by the sharp edges 124 of the spreader blades and the fruit flesh of the halves on opposite sides of the blades, separated by the several diverging surfaces of the blades.

As the pressure pads move inwardly, as shown in Figure 10, the pawl 342 ratchets over the staggered teeth 332 and 334 of the ratchet bars 330, and thus the pressure pads are latched or locked against reverse movement by a fruit which is below average ripeness. As will be seen in Figure 9, the pressure pad actuating cam 284 has a cam surface portion of decreasing radius immediately following the portion of increasing radius, each of these portions being of substantially 90 degrees in angular extent. The throw of the pressure pad yoke 158 is so adjusted, by adjustment of the bolt 312 in the slot 314, that the pressure pads cannot move into engagement with the periphery of the revolving disc when the cam follower roller 288 has reached the point of maximum radius of the cam 284.

Although the scoring blade 134 remains, through one-half of a revolution of a cam shaft, in forward, fruit-severing position, the pressing pads do not dwell in the forward fruit pressing position as shown in Figures 6 and 9, but are returned without substantial dwell from their furthermost, advance position. When the cam roller 288 approaches the point of maximum radius of cam 284, the ratchet cam 358 actuates the bar 338 in a counterclockwise direction as seen in Figure 10, and the screw 352 carried by that bar presses upon the arms 350 of the ratchet bars 330 and releases the ratchet bars from the pawl 342 thereby releasing the pressure pads for reverse movement.

While the pressure pads push or press the fruit inwardly of the turret, the spreader blade actuating cam 212 actuates the lever 218 in a clockwise direction thereby oscillating the rocker shaft 220 and the spreader blade actuating levers 222 and 224 in the same direction as seen in Figures 6 and 10a. These spreader blade actuating levers 222 and 224 when thus moved engage the rollers 118 of the spreader blade unit and swing these spreader blades outwardly and oppositely, thereby spreading the severed halves of the fruit and separating the same from the pit retained in the fork. The fruit halves immediately, or within the following 90 degrees of angular movement of the turret drop from the spreader blades, and the pit is thereafter discharged by gravity from the fork as the turret continues to revolve. As soon as the pressure pads have completed their forward movement their rearward movement is begun and thereafter the scoring blade 134 is moved reversely under the control of its actuating cam 248.

It may happen that an over-sized or over-long pit becomes stuck for a time in the fork and would not be discharged from the fork if the spreader blades were allowed to close and remain closed on passing of the rollers 118 beyond the roller engaging surfaces 232 of the actuating levers 222 and 224. In order to assure ample time for such pits to drop out of the forks before the spreader blades have closed, the stationary arcuate bars 234 and 236 engage the rollers 118 and maintain the spreader blades in open position for an additional angular movement of the revolving turret, these arcuate guide bars permitting the spreader blades to return to a closed abutting position before they reach the front guide bar 38 to receive a second fruit from the hands of the operator.

The invention is not to be limited to the specific details of construction disclosed herein but is capable of other modifications and changes without departing from the spirit and scope of the appended claims.

Having thus described the invention, what is claimed as new and desired to secure by Letters Patent is:

1. In a machine for processing fruit of the freestone type, a rotatable fruit conveyor having a radially disposed flesh severing unit on its periphery on which units fruit when impaled is partially severed, means operatively connected to said conveyor for continuously rotating the same, a flesh severing blade in substantially the same plane as that of the severing unit, means for periodically reciprocating said flesh severing blade toward and from the conveyor successively to engage and complete the severance of the flesh of the fruit impaled on the severing unit of the continuously rotating conveyor, the flesh severing unit on the conveyor comprising a pair of spreader members mounted on the conveyor for relative movement toward and from each other laterally of the conveyor to separate the severed sections of the fruit from each other, and means for moving said spreader members apart in timed relation with the reciprocation of said flesh severing blade to effect separation of the severed sections of the fruit after the severance of the fruit has been completed by the severing blade.

2. In a machine for pitting fruit of the freestone type, a fruit conveyor having a flesh severing unit on which fruit is to be impaled for partial severance of the flesh of the fruit and the feeding of the fruit by the conveyor, means operatively connected to the conveyor for continuously moving the same at a uniform rate, a second flesh severing unit mounted in spaced relation with said conveyor and in substantially the plane of the flesh-severing unit on the conveyor, means for moving said second flesh-severing unit toward and from the continuously moving conveyor to engage and complete the severance of a fruit impaled on the flesh severing unit of the conveyor, the flesh severing unit of the continuously moving conveyor comprising a pair of spreader members, means mounting said spreader members on said conveyor for relative movement from an abutting position entering the fruit as it is impaled on said unit to a spaced apart position separating the severed flesh sections of the fruit, means mounted to move toward and from the continuously moving fruit on the conveyor for engaging and pressing the fruit inwardly along the spreader members, and means for actuating said second flesh severing unit, said spreader members, and said pressing means in timed relation to first complete severance of the flesh of the fruit and then pressing the severed flesh of the fruit inwardly of the spreader members as the spreader members are moved apart to separate said sections of the fruit.

3. In a machine for processing fruit of the freestone type, a rotatable fruit conveyor disk having on its periphery a flesh severing cutting edge on which fruit is to be impaled for partially severing the fruit flesh and for feeding of the fruit by the conveyor, said cutting edge including a pair of spreader plates mounted on opposite sides of the disk and diverging radially inwardly from the cutting edge of the disk, a flesh severing blade mounted substantially in the plane of said cutting edge for movement toward and from the conveyor disk to engage and complete the severance of the flesh of the fruit impaled on the periphery of the conveyor disk, and fruit pressing means mounted for movement toward and from the periphery of the conveyor disk in timed relation to said flesh severing blade to engage and press the severed flesh sections of the fruit radially of the disk inwardly along the spreader members whereby to separate the severed sections of the fruit.

4. In a machine for pitting fruit of the freestone type, a continuously rotating turret having a plurality of pit pockets for partially encompassing the pits of the fruits and said turret having sharpened peripheral edge portions extending from the sides of the pockets partially to sever the flesh of whole fruits when impaled on the periphery of the turret with the pits of the impaled fruits inserted in the pit pockets of the turret, a fruit flesh severing blade mounted substantially in the plane of said sharpened peripheral edge portions for movement toward and from the periphery of the continuously rotating turret, means for moving said flesh severing blade toward the periphery of the turret to engage and complete severance of the fruit impaled on the periphery of the turret, and divergent spreader blades mounted on the turret at each of said pit pockets and projecting at their converging ends into the pit pockets of the turret to enter the flesh of the whole fruits as they are impaled on the turret with their pits inserted into the associated pit pockets and means for separating the spreader blades whereby to separate the sections of the fruits severed by said flesh severing blade as it is moved toward the periphery of the turret.

5. In a machine for pitting fruit as set forth in claim 4 wherein the turret is provided with a pit retaining fork mounted in each pit receiving pocket of the turret with the tines of the fork extending generally parallel to the plane of the turret but on opposite sides thereof to retain the pit against movement with the severed sections of the fruits as they are separated by the diverging spreader plates.

6. In a machine for pitting fruit of the freestone type, a turret rotated continuously at a uniform rate and having a plurality of angularly spaced pit pockets and sharpened peripheral edge portions extending oppositely from the side of each pit pocket to partially sever the flesh of a whole fruit when impaled on the periphery of the turret with the pit of the impaled fruit inserted in the pit pocket of the turret, a fruit flesh severing blade mounted substantially in the plane of the said sharpened peripheral edge portions, means mounting said blade for movement toward and from the periphery of the turret to engage and complete the severance of the fruit impaled on the periphery of the turret, pairs of fruit spreading plates with cutting edges shiftably mounted on said turret at each of said pockets for movement from a position wherein the plates of each pair project into a pit pocket to enter the fruit to a spaced apart position separating the severed sections of the fruit, and a pit retaining member in each pit receiving pocket of the turret, said pit retaining member having spaced opposed portions extending generally radially of the turret on opposite sides of the plane of the turret to embrace opposite sides of the pit in a pit pocket of the turret to retain the pit in the pocket against movement with the severed sections of the fruit as they are separated by the spreading plates.

7. In a machine for pitting fruit of the freestone type, the combination of a rotatable fruit conveyor disk having along its periphery spaced pockets receiving and encompassing the pits of whole fruits impaled on the disk, said conveyor disk having peripheral cutting edges on opposite sides of each pocket for cutting into the flesh of the whole fruit as it is impaled upon the disk and the pit therefore inserted in a pit pocket, means operatively connected with the conveyor disk for continuously rotating said conveyor disk at a uniform rate, a flesh severing blade mounted in radially spaced relation to the periphery of said conveyor disk and in substantially the plane of said peripheral cutting edges, means for periodically reciprocating said flesh severing blade in a direction radially of and toward said conveyor disk during the rotation of said disk, said flesh severing blade having a relatively long arcuate cutting edge facing the periphery of the disk and extending when in contact with the fruit impaled on the disk substantially concentric with the periphery of the impaling disk whereby said blade severs uncut portions of the fruit during the continuous movement of the fruit conveyor disk as the fruit is transported by the disk along the flesh severing blade and spreader plates having cutting edges between adjacent ends of said peripheral edges to sever the flesh of the fruit, and means for separating said spreader plates to separate the severed sections of the fruit.

8. In a machine for pitting fruit of the freestone type, a fruit conveyor disk having thereon a plurality of spaced fruit impaling units, each such unit including a pit receiving pocket and fruit flesh severing edges on opposite sides of the pocket for cutting into the flesh of the whole fruit as the fruit is impaled on the disk with the pit inserted in the pocket of the unit, means operatively connected with said conveyor disk for continuously rotating said disk at a uniform rate, a flesh severing blade mounted in spaced relation to said conveyor disk and lying in the plane of said severing edges, means for periodically moving said flesh severing blade toward and from the disk in the plane of the disk and in a direction radially of the disk, said flesh severing blade having a relatively long arcuate cutting edge substantially concentric with the disk whereby to sever the uncut flesh of the fruit projecting beyond the periphery of the disk when the blade is moved toward the disk, and presser pads on opposite sides of the flesh severing blade mounted for movement radially of the disk toward and from the periphery of the disk for pressing the fruit inwardly of the disk and bodily over the flesh severing edges of the fruit impaling units on the disk to complete cutting of the flesh of the fruit by said flesh severing edges of the fruit impaling units.

9. In a machine for pitting fruit of the freestone type, a rotating fruit conveyor disk having peripheral cutting edges spaced by pit receiving pockets extending radially inwardly from the periphery of the disk, a scoring blade mounted for movement in the plane of the cutting edges into the fruit impaled on the disk to sever the flesh of the fruit projecting beyond the disk periphery, means for moving said blade toward and from the disk, a pair of spreader plates swingably mounted on the disk at opposite sides thereof and at each pit pocket and diverging in a direction radially inwardly of the disk, said spreader plates having cutting edges, means for swinging said spreader plates toward each other to mutually adjacent positions to sever the flesh of a whole fruit when impaled on said disk and away from each other to separate the severed sections of the fruit after operation of said scoring blade upon the fruit, and a pit retaining fork mounted on the disk in each pit pocket to encompass opposite sides of the pit of a fruit in each pocket whereby to retain each pit against movement upon separating of the severed sections of the fruit by the spreader plates.

10. A machine for pitting fruit of the freestone type, comprising a fruit conveyor disk, means operatively connected with said conveyor disk for continuously rotating said disk, said disk having a plurality of pit receiving peripherally opening pockets and sharpened peripheral cutting edges between said pockets for partially severing the flesh of a whole fruit when impaled on the disk, a pair of spreader plates movable swingably on opposite sides of the disk at each pocket and having beveled cutting edges overlying the edges of the pit pockets to sever the flesh of the fruit around the pits, a pit retaining member having a pair of spaced prongs extending outwardly from the bottom of each of said pit pockets for gripping opposite sides of the pit of a fruit when impaled on the disk, a scoring blade mounted in substantially the plane of said cutting edges for movement toward and from the disk and having a cutting edge in the plane of the conveyor disk, means for periodically moving said scoring blade toward the disk to sever the flesh of the fruit projecting beyond the periphery of the disk, means for successively swinging the spreader plates of each pair away from each other in timed relation to the movement of the scoring blade toward the disk to separate the severed flesh sections of the fruit from each other and from the pit held between the prongs of the pit retaining member, and means for thereafter moving the spreader plates toward each other to position them in juxtaposition to the disk to penetrate the flesh of another whole fruit as it is impaled on the fruit conveyor disk.

11. A machine for pitting fruit as set forth in claim 10 which includes a fruit presser pad mounted for movement toward and away from the periphery of said disk, and means for moving said presser pad in timed relation with the movement of said scoring blade for pressing the fruit bodily inwardly of the disk onto said spreader plates.

References Cited in the file of this patent

UNITED STATES PATENTS

| | | |
|---|---|---|
| 404,517 | Briggs | June 4, 1889 |
| 921,523 | Dunkley | May 11, 1909 |
| 1,056,965 | Baltzley | Mar. 25, 1913 |
| 1,545,003 | Meacham | July 7, 1925 |
| 1,754,636 | McCollom | Apr. 15, 1930 |
| 1,949,642 | Owa et al. | Mar. 6, 1934 |
| 2,185,090 | Millen | Dec. 26, 1939 |
| 2,280,813 | Ewald et al. | Apr. 28, 1942 |
| 2,301,979 | Smilie | Nov. 17, 1942 |
| 2,403,516 | Gaddini | July 9, 1946 |
| 2,403,518 | Gaddini | July 9, 1946 |
| 2,531,927 | Waters | Nov. 28, 1950 |
| 2,585,073 | Altman | Feb. 12, 1952 |
| 2,588,575 | Rollins | Mar. 11, 1952 |
| 2,652,085 | Ansley | Sept. 15, 1953 |